June 1, 1965  R. CHUTE  3,186,167

CONTROL FOR GAS TURBINE FUEL PUMP SYSTEM

Filed Oct. 8, 1962

INVENTOR.
RICHARD CHUTE

BY *Hanke & Hanke*

ATTORNEYS

United States Patent Office 3,186,167
Patented June 1, 1965

3,186,167
CONTROL FOR GAS TURBINE FUEL
PUMP SYSTEM
Richard Chute, Huntington Woods, Mich., assignor to Continental Motors Corporation, Detroit and Muskegon, Mich., a corporation of Virginia
Filed Oct. 8, 1962, Ser. No. 229,108
9 Claims. (Cl. 60—39.28)

The present invention relates to pneumatic controls for turbine engines and more particularly to a centrifugal jet fuel pump system and pneumatically operated means automatically regulating the pump to control engine speed.

Present fuel systems for gas turbine engines are generally built around small positive displacement high pressure pumps. Due to the manufacturing tolerances required for the success of such pumps, these units represent a large portion of the cost of manufacturing fuel control systems for turbine engines. Further, this type of pump is limited to a very low speed range to insure long life. The low speed necessary for the pump necessitates the use of accessory reduction gears between the engine and the pump adding further expense and increasing the likelihood of malfunction.

It is an object of the present invention to increase the reliability of fuel control systems for gas turbine engines by providing an engine driven fuel pump having few moving parts and a pneumatic control system for regulating the pump.

It is another object of the present invention to reduce the cost of manufacturing fuel control systems for gas turbine engines by providing a directly connected engine driven fuel pump capable of being driven at higher speeds and a pneumatic governing system operable to automatically regulate the output of the fuel pump.

It is still another object of the present invention to prevent cavitation of the fuel pump by providing a centrifugal pump and means maintaining a relatively high pressure on the intake of the centrifugal pump.

It is yet another object of the present invention to prevent overspeeding of the turbine in a gas turbine engine by providing a fuel pump and control means automatically operable to restrict fuel flow through the fuel pump upon starting the turbine and during acceleration to the governed speed.

Other objects and advantages will readily occur to one skilled in the art to which the invention pertains upon reference to the following drawings in which like characters refer to like parts throughout the several views and in which FIG. 1 is a longitudinal cross sectional view of a fuel control of the present invention.

Figure 1:
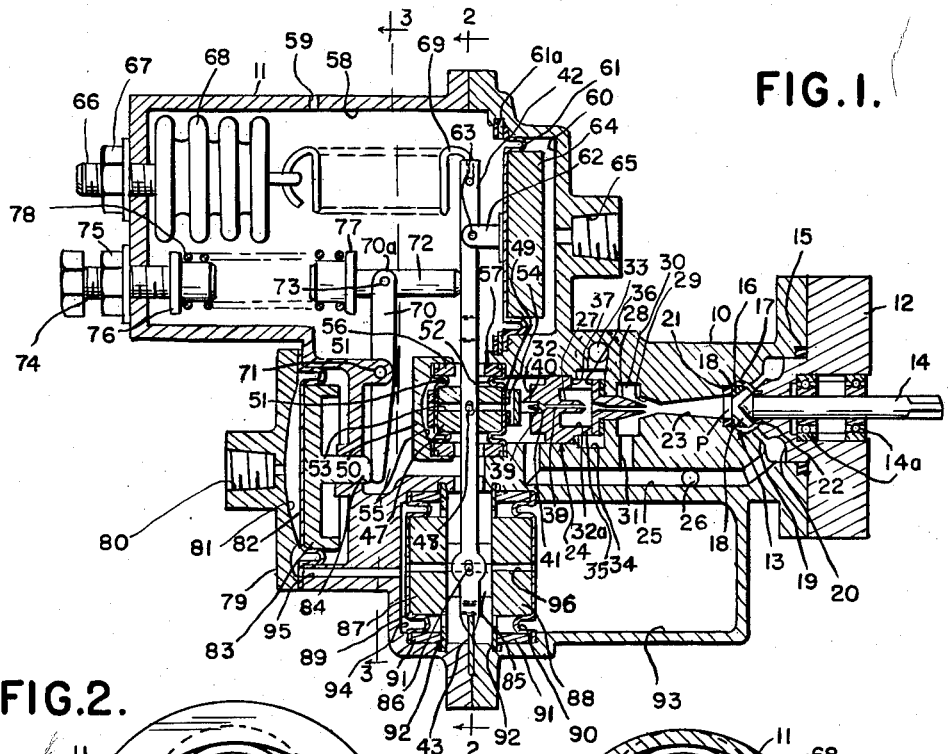

Now referring to the drawings for a more detailed description of the present invention, a preferred fuel control is illustrated as comprising a pump housing 10 and a control housing 11 preferably secured together to form a single unit.

An end cap 12 closes one end of the pump housing 10 and a centrifugal pump 13 is carried in the housing 10 adjacent the end cap 12. The centrifugal pump 13 preferably carries a shaft 14 adapted to be directly driven by the turbine engine (not shown) and rotatably carried in the end cap 12 by bearings 14a. An O-ring seal 15 is provided between the housing 10 and the end cap 12. The shaft 14 is provided with an enlarged head portion 16 carried in a chamber 17 provided in the pump housing 10. The enlarged head portion 16 is provided with a plurality of passages 18 angling from a common point P on the end of the shaft 14 to the chamber 17. A discharge passage 19 provides communication between the chamber 17 and a substantially annular collection chamber 20 formed in the housing 10 and the end cap 12. Seals 21–22 are provided between the head portion 16 and the housing 10 and between the head portion 16 and the end cap 12 respectively.

The intake side of the centrifugal pump 13 is connected with an intake chamber 23 which is in turn connected to a jet pump assembly 24. The collection chamber 20 is connected with a passage 25 provided in the housing 10 and a fuel outlet 26 communicates with the passage 25.

The jet pump assembly 24 preferably comprises a first injector 27 and a second injector 28 connected in series as shown. The second injector 28 is disposed to inject fuel into a venturi passage 29 and into the intake chamber 23. An annular chamber 30 communicates with the venturi passage 29 and a branch passage 31 provides communication between the passage 25 and the chamber 30. The passage 25 communicates with an intake chamber 32 opening to the intake side of the first injector 27. The first injector 27 discharges into a chamber 32a which forms the intake for the second injector 28. A fuel inlet 33 is adapted for connection with a fuel supply and opens to an annular chamber 34. The first injector 27 is preferably provided with an axially extending flange portion 35 which bears against a radially extending flange portion 36 of the second injector 28. The flange portion 35 is provided with a plurality of annularly spaced slots 37 which provide communication between the annular chamber 34 and the chamber 32a.

The first injector 27 is provided with an injection passage 38 and an axially aligned recess 39 communicating therewith. A valve member 40 is axially slidably carried in the recess 39 and is provided with a plurality of annularly spaced axially extending dished portions 41.

A lever 42 is pivotally mounted at the juncture of the pump housing 10 and the control housing 11 by a flex strip 43. As can best be seen in FIG. 2, the lever 42 preferably comprises adjacent strips 42a and 42b bent outwardly as at 44 and inwardly at 45 to form a yoke portion 46. A block 47 is carried in the yoke portion 46 by pivot pins 48. The valve member 40 preferably comprises a cylindrical portion 49 carried by the block 47. The housing 11 is provided with a boss portion 50. A diaphragm 51 is carried intermediate one end of the block 47 and the boss portion 50 and a diaphragm 52 is carried intermediate the housing 10 and the other end of the block 47. An axial passage 53 provided in the block 47 communicates with a transverse passage 54 provided in the cylindrical portion 49 and provides communication between a chamber 55 formed by the boss portion 50 and the diaphragm 51 and the intake chamber 32. Snap rings 56–57 retain the diaphragms 51–52 respectively.

The housing 11 is provided with an atmospheric chamber 58 open to the atmosphere by a port 59. The housing 10 is provided with a recess 60 opening to the chamber 58. A diaphragm 61 is carried in the recess 60 by snap rings 61a and is connected with the lever 42 by linkage 62 and a pivot pin 63. The diaphragm 61 carries on one side a piston 64 open to the recess 60 and has the other side exposed to the atmospheric chamber 58. The housing 10 is provided with a pressure inlet 65 opening to the recess 60 and adapted to be connected with the compressor inlet (not shown) to sense compressor inlet static pressure.

A threaded rod 66 is adjustably carried in the housing 11 by a nut 67 and provides the means by which a temperature and pressure reacting bellows 68 is carried in the atmospheric chamber 58. A spring 69 is biased between the bellows 68 and the lever 42.

Figure 2:
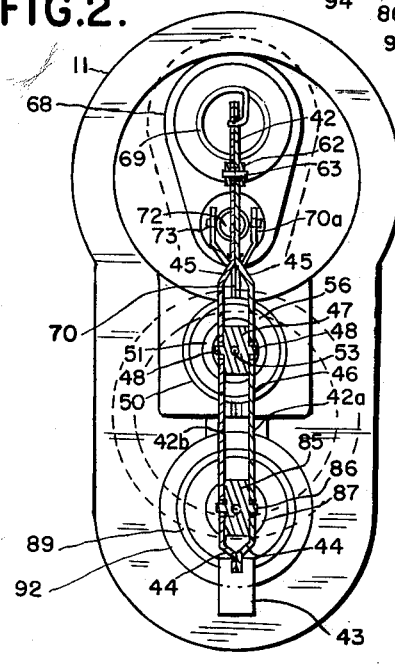
FIG. 2 is a cross sectional view taken substantially on line 2—2 of FIG. 1.
Figure 3:
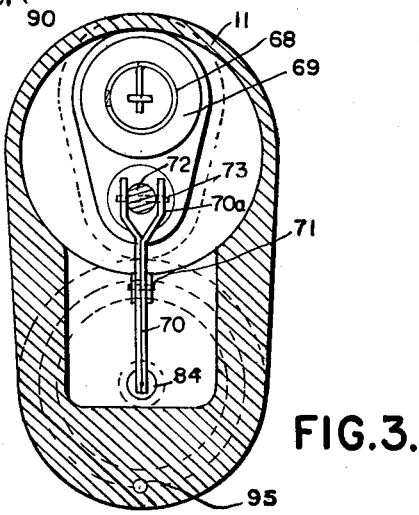
FIG. 3 is a cross sectional view taken substantially on line 3—3 of FIG. 1.

A lever 70 is pivotally carried in the chamber 58 by a pivot pin 71 and has a yoke portion 70a as can best be seen in FIGS. 2-3 pivotally carrying a rod 72 by a transverse pivot pin 73. A threaded rod 74 is adjustably carried in the housing 11 by a nut 75 in a position extending into the chamber 58 and axially aligned with the rod 72. The rod 74 and rod 72 are provided with radial flanges 76–77 respectively which provide the seats for a spring 78. The spring 78 urges the end of the rod 72 to abut against the lever 42.

The housing 11 is provided with a cap member 79 having an inlet 80 adapted to be connected to the outlet of the compressor discharge (not shown) and opening to a pressure chamber 81. A diaphragm 82 is carried in the pressure chamber 81 between the housing 11 and the cap member 79. A piston 83 is carried by the diaphragm 82 and has an arm 84 engaging the lever 70.

A block 85 is carried by the yoke portion 46 of the lever 42 by pivot pins 86 in a position spaced between the block 47 and the flex strip 43. Pistons 87–88 are carried at opposite ends of the block 85 and these in turn carry diaphragms 89–90 respectively. The diaphragms 89–90 are secured to the housings 11–10 respectively by rings 91 which are in turn retained by wedge rings 92. The diaphragm 90 is exposed to pressure in a large volume chamber 93 provided in the housing 10 and the diaphragm 89 is exposed to pressure in a smaller volume chamber 94 provided in the housing 11. The chamber 94 communicates with the inlet 80 by a passage 95 and an orifice 96 through the pistons 87–88 and the block 85 provides communication between the chambers 93–94.

With the valve member 40 in an open position a high energy fuel jet issues from the first injector 27 creating a pressure lower than atmospheric in chamber 32a allowing fuel to enter by means of the slots 37 and the fuel inlet port 33. Energy is transferred to the incoming fuel from the high energy jet and is pumped into chamber 23 by means of the venturi passage 29 and the additional energy provided by the pump discharge flowing through passage 31. Engine fuel is then discharged through the centrifugal pump 13 and out the outlet 26. Approximately 11/12 of the maximum engine fuel requirement is recirculated into the jet pump 24 through the passages 25 and 31 to pump the incoming fuel. The jet pump 24 is constructed in two stages to prevent boundary layer separation at high recovery ratios. The two stage jet pump 24 provides a means of introducing fuel through the inlet 33 at below atmospheric pressures while maintaining a relatively high pressure on the intake side of the centrifugal pump 13. Thus the centrifugal pump 13 is always pressurized above the cavitational limits of the pump.

Closing the valve member 40 limits the fuel supplied to the first injector 27. The amount of fuel entering the pump is decreased; therefore the entire system pressure level decreases proportional to the degree of closing of the valve member 40. When the valve member 40 is completely closed only the pressure created by the centrifugal pump 13 is available to the engine.

The control means automatically operates the valve member 40 to control the engine. Initially the valve member is held closed by the rod 72 bearing against the lever 42. As compressor outlet pressure rises during initial motoring of the engine, the arm 84 moves against the lever 73 and at a predetermined compressor speed will overcome the spring 78 and move the rod 72 away from the lever 42. This prevents the valve member 40 from opening until the engine speed is sufficiently high to permit ignition of the fuel.

The pressure differential across the diaphragm 61 will pivot the lever 42 to open and close the valve member 40 to maintain a predetermined engine speed after the initial motoring period. The diaphragm 61 responds with changes in compressor inlet static pressure and atmospheric pressure and this is an indicator of engine weight flow. As engine speed increases beyond the predetermined speed, inlet static pressure decreases moving the diaphragm 61 and lever 42 to the right as seen in FIG. 1 to close the valve means 40 and thus reduce fuel flow to the engine.

As engine speed decreases below the predetermined desired value inlet static pressure increases, moving the diaphragm 61 and the lever 42 to the left as seen in FIG. 1 to open the valve 40 and increase fuel to the engine.

The bellows 68 is responsive to both temperature and atmospheric changes and regulates the position of the lever 42 accordingly.

To limit the rate of pressure rise in the compressor during acceleration to the predetermined set speed a time delay means is provided. The time delay means comprises the diaphragms 89–90 and the orifice 96. The diaphragm 61 would retain the valve member 40 in an open position as long as the engine had not accelerated beyond the predetermined desired speed. To prevent a too rapid acceleration, the diaphragms 89–90 tend to close the valve member 42 for a predetermined interval when the engine is being accelerated too rapidly as sensed by compressor outlet pressure. The chamber 94 has a smaller volume than the chamber 93. Compressor outlet pressure acting on the diaphragm 89 will tend to close the valve member 40 until the pressure in the chambers 93–94 is equalized through the orifice 96.

Although I have described but one embodiment of the present invention, it is apparent that other changes and modifications may be made without departing from the spirit of the invention or the scope of the appended claims.

I claim:

1. A fuel control for an internal combustion engine having an air intake provided with a compressor, said fuel control comprising
   (a) a fuel pump having an intake chamber, an inlet connected to said intake chamber and an outlet,
   (b) valve means disposed intermediate said inlet and said intake chamber and being operable to regulate fuel flow therethrough,
   (c) control means comprising a pressure responsive means operably connected with said valve means,
   (d) one side of said pressure responsive means being connected to sense changes in the static inlet pressure of the compressor and the other side of said pressure responsive means being open to the atmosphere,
   (e) said control means further comprising a pivotally mounted lever operably connecting said pressure responsive means and said valve means and being operable upon pivoting to open and close said valve means,
   (f) said pressure responsive means being operable to pivot said lever to a position closing said valve means upon the static inlet pressure of the compressor decreasing to a predetermined value,
   (g) said control means further comprising compensating means operably connected with said lever and being operable to pivot said lever in response to temperature and atmospheric pressure changes,
   (h) said control means further comprising a second pressure responsive means operably connected to said lever, said second pressure responsive means being operable to close said valve means until a predetermined compressor outlet pressure has been produced by the compressor.

2. The fuel control as defined in claim 1 and in which said control means further comprises (a) a time delay means operably connected with said lever,
(b) said time delay means being operable to delay for a predetermined time the closing of said valve means produced by said first mentioned pressure responsive means.

3. A fuel control for an internal combustion engine having an air intake provided with a compressor, said fuel control comprising,
(a) a fuel pump having an intake chamber, an inlet connected to said intake chamber and an outlet,
(b) valve means disposed intermediate said inlet and said intake chamber and being operable to regulate fuel flow therethrough,
(c) control means operably connected to said valve means and being operable to close said valve means upon a predetermined weight flow being produced by the compressor,
(d) control means comprising a pivotally mounted lever connected with said valve means and being operable upon pivoting to open and close said valve means,
(e) said control means further comprising a pressure responsive means operably connected to said lever and being operable to close said valve means until a predetermined compressor outlet pressure has been produced by the compressor,
(f) a fuel pump comprising a centrifugal pump connected with said intake chamber and having a collecting chamber connected with said outlet and a jet pump connected with said inlet and disposed intermediate said valve means and said intake chamber,
(g) said jet pump comprising a first injector and a second injector, said second injector being positioned to inject fuel into said intake chamber, said first injector being positioned to inject fuel into said second injector, and said valve means being operable to regulate fuel flow through said first injector.

4. The fuel control as defined in claim 3 and in which said fuel pump includes
(a) a passage connecting said collecting chamber with the intake side of said first injector,
(b) said inlet being connected with the intake side of said second injector, and
(c) a branch passage connecting said passage with the discharge of said second injector.

5. A fuel control for an internal combustion engine having an air intake provided with a compressor, said fuel control comprising,
(a) a fuel pump having an intake chamber, an inlet connected to said intake chamber and an outlet,
(b) valve means disposed intermediate said intake and said intake chamber and being operable to regulate fuel flow therethrough,
(c) control means operably connected to said valve means and being operable to close said valve means upon a predetermined weight flow being produced by the compressor,
(d) said control means comprising a pivotally mounted lever connected with said valve means and being operable upon pivoting to open and close said valve means,
(e) said control means further comprising a pressure responsive means operably connected to said lever and being operable to close said valve means until a predetermined compressor outlet pressure has been produced by the compressor, and
(f) said control means further comprising a time delay means operably connected with said lever, said time delay means being operable to delay for a predetermined time the closing of said valve means.

6. The fuel control as defined in claim 5 and in which said control means further comprises compensating means operably connected with said lever and being operable to pivot said lever in response to temperature and atmospheric pressure changes.

7. The fuel control as defined in claim 5 and including a second pressure responsive means operably connected with said valve means, one side of said second pressure responsive means being connected to sense changes in the static inlet pressure of the compressor and the other side of said second pressure responsive means being open to the atmosphere.

8. In combination with a turbine engine having a turbine driven shaft, a fuel system comprising,
(a) a centrifugal pump having an inlet and an outlet and drivingly carried by said turbine driven shaft,
(b) a jet pump having a first ejector, a second ejector, each having an intake side and a discharge side, and means connecting the discharge side of said first ejector with the intake side of said second ejector,
(c) means connecting the discharge side of said second ejector with said inlet of said centrifugal pump,
(d) means connecting said outlet of said centrifugal pump with the intake side of said first ejector,
(e) a fuel inlet adapted for connection to a fuel reservoir and communicating intermediate the discharge side of said first ejector and the intake side of said second ejector,
(f) means connected with said outlet of said centrifugal pump for delivering fuel to said engine,
(g) a valve means operable to regulate fuel flow through said first ejector,
(h) a first control means operable to close said valve means upon a predetermined combustor weight flow being produced by said engine, and
(i) a second control means operable to retain said valve means in a closed position until a predetermined compressor outlet pressure has been produced.

9. In combination with a turbine engine having a turbine driven shaft, a fuel system comprising,
(a) a centrifugal pump having an inlet and an outlet and drivingly carried by said turbine driven shaft,
(b) a jet pump having a first ejector, a second ejector, each having an intake side and a discharge side, and means connecting the discharge side of said first ejector with the intake side of said second ejector,
(c) means connecting the discharge side of said second ejector with said inlet of said centrifugal pump,
(d) means connecting said outlet of said centrifugal pump with the intake side of said first ejector,
(e) a fuel inlet adapted for connection to a fuel reservoir and communicating intermediate the discharge side of said first ejector and the intake side of said second ejector,
(f) means connected with said outlet of said centrifugal pump for delivering fuel to said engine,
(g) a valve means operable to regulate fuel flow through said first ejector,
(h) a control means operable to close said valve means upon a predetermined combustor weight flow being produced by said engine, and
(i) time delay means operably connected with said valve means and being operable to delay the closing of said valve means for a predetermined time period.

References Cited by the Examiner
UNITED STATES PATENTS

| | | | |
|---|---|---|---|
| 2,429,005 | 10/47 | Watson | 60—39.28 |
| 2,540,594 | 2/51 | Price | 60—39.28 |
| 2,826,147 | 3/58 | Gaubatz | 103—5 |
| 3,012,401 | 12/61 | Harner | 60—39.28 |
| 3,043,104 | 7/62 | Magnus | 60—39.28 |
| 3,067,581 | 12/62 | Reggio | 60—39.28 |

FOREIGN PATENTS
175,107 2/35 Switzerland.

SAMUEL LEVINE, *Primary Examiner.*